United States Patent [19]

Mordant

[11] Patent Number: 4,649,440
[45] Date of Patent: Mar. 10, 1987

[54] MAGNETIC-TAPE-CASSETTE APPARATUS WITH IMPULSE RESET TO THE REST POSITION

[75] Inventor: Ludo H. J. Mordant, Eindhoven, Netherlands

[73] Assignee: U.S. Philips Corporation, New York, N.Y.

[21] Appl. No.: 770,030

[22] Filed: Aug. 27, 1985

[30] Foreign Application Priority Data

Aug. 30, 1984 [NL] Netherlands .................. 8402637

[51] Int. Cl.$^4$ .................... G11B 15/10; G11B 15/18
[52] U.S. Cl. .................................. 360/69; 360/105
[58] Field of Search ............ 360/69, 75, 78, 90, 360/96.4, 105, 137, 96.1, 104, 93, 96.3, 96.5

[56] References Cited

U.S. PATENT DOCUMENTS 4,071,861  1/1978  Hirose ........................... 360/96.4
4,336,560  6/1982  Matsumoto ..................... 360/137
4,568,989  2/1986  Ohhara et al. .................. 360/105

Primary Examiner—Raymond F. Cardillo
Assistant Examiner—Steven R. Garland
Attorney, Agent, or Firm—David R. Treacy

[57] ABSTRACT

In a magnetic-tape-cassette apparatus comprising a servo device for actuating at least one apparatus part, if the apparatus is in the "play" mode and the power supply fails, the apparatus part is returned to its rest position. A switch detects the position of the apparatus part, and a second circuit having an input coupled to an output of the first means and having an output coupled to the impulse relay supplies a brief electric energizing signal to an impulse relay at the instant in which the power supply to the servo device is cut off if the apparatus part is in its operating position. The switch ensures that no energizing signal is supplied at the instant at which the power supply is cut off if the apparatus is in the rest position.

12 Claims, 9 Drawing Figures

4,649,440

MAGNETIC-TAPE-CASSETTE APPARATUS WITH IMPULSE RESET TO THE REST POSITION

BACKGROUND OF THE INVENTION

The invention relates to a magnetic-tape-cassette apparatus, comprising a servo device for positioning at least one apparatus part. The servo device comprises a servo wheel having at least one recessed portion, which faces a motor-driven wheel in a rest position of the servo wheel, and carries an eccentric cam and at least one latching projection. The eccentric cam is subjected to a starting torque produced by spring force in the rest position of the servo wheel. The servo device further comprises a relay-armature member which is pivotable between a latching position and an inoperative position and carries a soft-iron element which in the rest position of the servo wheel is attracted by an impulse relay and thereby maintains the relay-armature member in the latching position. In this position a stop projection on the relay-armature member cooperates with the latching projection on the servo wheel, so that the stop projection keeps the servo wheel latched in the rest position. After a brief electrical energization of the impulse relay, the relay-armature member is pivoted under spring force from the latching position to the inoperative position. In the inoperative position the stop projection is clear of the latching projection and, under the influence of the starting torque exerted on the eccentric cam, the servo wheel is rotated, the circumference of the servo wheel engages the motor-driven wheel, and the servo wheel is driven by the motor to position the apparatus part. The latching projection then cooperates with a reset projection on the relay-armature member, so that the relay-armature member is returned against spring force from the inoperative position to the latching position. Subsequently the latching projection again abuts against the stop projection, and the stop projection again latches the servo wheel in the rest position.

Such a magnetic-tape-cassette apparatus is known from a document published by KISHO-Electronics Co., Ltd. (Japan). The motor-driven wheel shown therein is a gear wheel, and the servo wheel is consequently provided with teeth around its circumference. However, other cooperations between the motor-driven wheel and the servo wheel are alternatively possible, e.g. a cooperation by means of friction, see German Offenlegungsschrift 2,628,287 to which U.S. Pat. No. 4,071,861 corresponds. The magnetic-tape-cassette apparatus proposed therein comprise a relay-armature member which keeps the servo wheel latched in the rest position under the influence of an impulse relay. Such an impulse relay comprises a permanent magnet which in the latching position of the relay-armature member firmly attracts this member by means of the soft-iron element. Around the magnet a coil is arranged to form an electromagnet which can be connected briefly to an electric current source by means of a switch.

The construction and arrangement of the electromagnet relative to the permanent magnet is such that the permanent magnet is rendered magnetically neutral while the current source is switched on. As a result of this, the relay-armature member is no longer attracted and a spring can cause the relay-armature member to be pivoted to the inoperative position, so that the servo wheel is released and can be rotated. The advantage of such an impulse relay is that the current source need only be switched on for a short time, which is adequate to allow the impulse relay to be rendered magnetically neutral for a short time and the relay-armature member to be pivoted. This brief switching-on has the advantage that the current source of the magnetic-tape-cassette apparatus is loaded only briefly and the impulse relay consumes only a small current. This is not only an advantage for battery-powered apparatuses but it is also advantageous for modern microprocessor-controlled equipment, in which such a brief energization is simple to achieve. Moreover, such an impulse relay can be of compact construction and has only a very small heat dissipation in comparison with a conventional electromagnet. The known magnet-tape-cassette apparatus has the drawback that often tape spillage occurs and that the reproduced signal often contains a substantial distortion component.

SUMMARY OF THE INVENTION

It is the object of the invention to provide a magnetic-tape-cassette apparatus in which tape spillage is (substantially) precluded and in which the reproduced signal has a substantially smaller distortion component.

In accordance with the invention, for moving the apparatus part from a first position, corresponding to a rest position of the apparatus part, to a second position, corresponding to an operating position of the apparatus part, and back to said first position, the servo device further comprises:

first means for determining which of the two positions the apparatus part occupies, and second means having an input coupled to an output of the first means and having an output coupled to the impulse relay, which second means are capable of supplying a brief electric energizing signal to the impulse relay at the instant at which the power supply is cut off if the apparatus part is in the second position, but not at said instant if the apparatus is in the first position.

The invention is based on the recognition of the following facts. The known magnetic-tape-cassette apparatus has the disadvantage that if the power supply is cut off while the apparatus is, for example, in the playback mode, the magnetic-tape transport (which is for example effected via a capstan and a pressure roller cooperating with the capstan, between which the magnetic tape is clamped) is stopped, and the capstan and the pressure roller remain in a position in which they are urged against one another. The playback head also remains positioned against the magnetic tape. This results in a deformation of the magnetic tape and the pressure roller.

If subsequently the power supply is restored
(a) tape spillage may occur because the magnetic tape sticks to the pressure roller,
(b) the magnetic-tape transport may no longer be uniform because the pressure roller is permanently deformed, which may give rise to distortion in the reproducted signal.

In order to avoid that, when the power supply is cut off, the apparatus part (for example the pressure roller or the head-mounting plate carrying the pressure roller) remains in said second position, second means are proposed which at the instant at which the power supply is cut off can nevertheless supply a brief electric energizing signal, which of course is effected only if the apparatus part is in the second position and not if it is in the first position.

If the apparatus part is in the first position it is obviously undesirable to generate the energizing signal. Therefore the first means are utilized to detect the position of the apparatus part.

The first means may comprise a switch whose state is related to the position of the apparatus part. If the apparatus part is in the first position the switch is, for example, open and if the apparatus part is in the second position the switch is in the other state (the switch is closed).

The second means may comprise a transistor having its control electrode coupled to a first point at a first potential, having a first main electrode coupled to a second point at a second potential via a delay means, and having a second main electrode coupled to a third point at a third potential via an impedance and to the output of the second means. The transistor may be bipolar transistor or a transistor of other types such as FETs or thyristors. The circuit proposed above has the advantage that it can easily be integrated. Preferably the third point is at a lower potential than the first point and the second point, and the transistor is a PNP transistor whose emitter and collector constitute the first main electrode and the second main electrode, respectively. Further, it is to be noted that the first point is preferably at such a potential that the transistor is cut off during normal use of the magnetic-tape-cassette apparatus. This means that the first point should be at a potential which is higher than or equal to the potential at the second point. This ensures that the normally cut-off transistor (which is advantageous in view of the power consumption, in particular in the case of the battery-powered equipment) is briefly turned on, at the instant at which the power supply is cut off, so that a brief electric energizing signal is generated.

In a first embodiment the collector of the transistor is coupled to the base of a second transistor of the NPN type via a first impedance. The second transistor has its emitter coupled to the third point and has its collector coupled to the second point via a second impedance and to the base of a third transistor of the PNP type via a diode and a third impedance. The collector of said third transistor constitutes the output of the second means and is coupled of the third point via a diode. The third transistor has its base coupled to a fourth point at a fourth potential via a fourth impedance, and has its emitter coupled directly to said fourth point.

In a second embodiment the collector of the transistor is coupled to the base of a second transistor of the NPN type via a first impedance. The second transistor has its emitter coupled to the third point; and has its collector coupled to the second point via a second impedance, and to the collector of a third transistor of the PNP type, whose emitter is coupled to the base of a fourth transistor of the PNP type via a third impedance. The collector of said fourth transistor constitutes the output of the second means and is coupled to the third point via a diode. The fourth transistor has its base coupled to a fourth point at a fourth potential via a fourth impedance, and has its emitter coupled directly to said fourth point.

The first embodiment may be characterized further in that the input of the second means is coupled to the base of a fourth transistor of the NPN type, whose emitter is coupled to the third point and whose collector is coupled to the base of the second transistor. This can be the means of ensuring that if the apparatus part is in the first position the second means produce no energizing signal for the impulse relay when the power supply is cut off.

For the same reason the second embodiment may be characterized further in that the input of the second means is coupled to the base of the third transistor.

The magnetic tape-cassette apparatus may be characterized further in that a zener diode is arranged in the connection between the first point and the control electrode of the first mentioned transistor. This enables the time interval between the instant at which the power supply drops and the instant at which this is detected to be varied. This may be achieved by selecting zener diodes with a certain zener voltage. Moreover, it is possible to employ power-supply voltages which are rectified less effectively and therefore exhibit a substantial ripple.

Preferably, the first means comprise a switch which has one terminal coupled to the third point and which has its other terminal coupled to the output of the first means. The switch is open if the apparatus part is in the first position and closed if the apparatus part is in the second position. In this way the desired input signal for the second means is obtained.

A magnetic-tape-cassette apparatus embodying the invention will now be described in more detail, by way of non-limitative example, with reference to the accompanying drawings.

DESCRIPTION OF THE PREFERRED EMBODIMENTS

Figure 1:
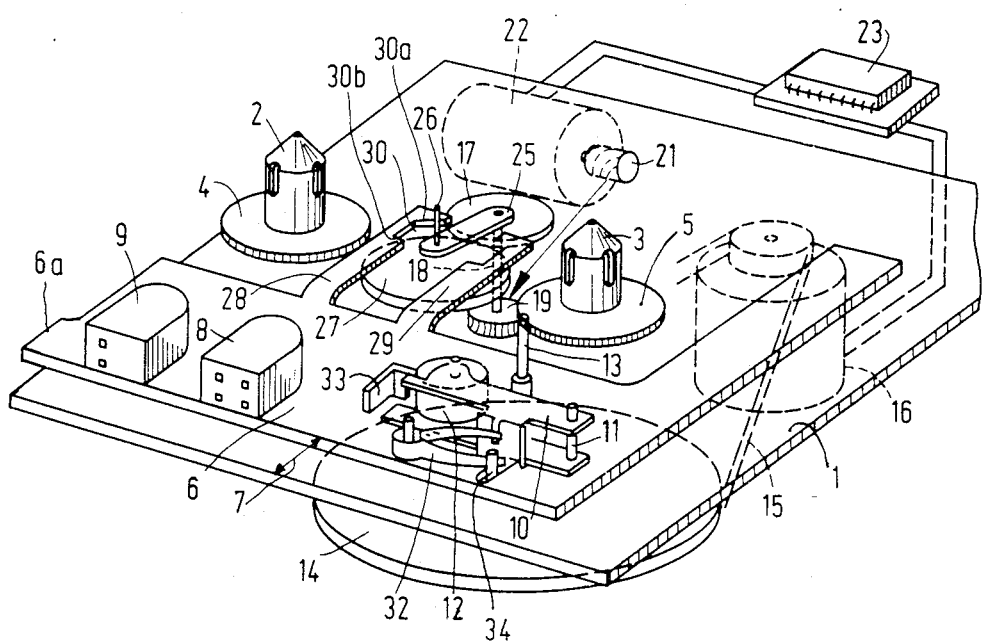
FIG. 1 is a perspective plan view of the relevant part of a magnetic-tape-cassette apparatus in accordance with the invention.
Figure 6:
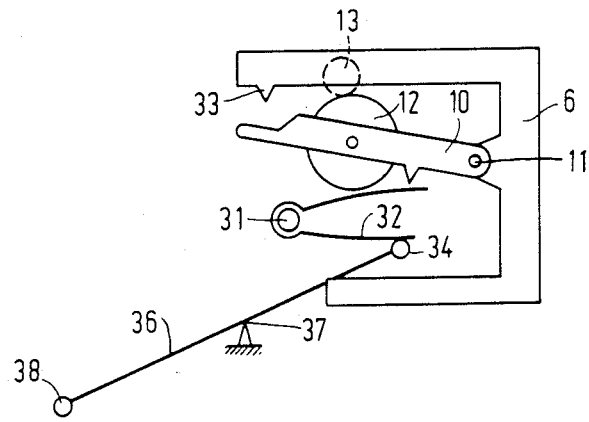
FIG. 6 is a schematic plan view showing a part of the head-mounting plate, which is in an advanced position and the actuating member which co-operates with this plate.

The magnetic-tape-cassette apparatus shown in FIG. 1 comprises a deck plate 1, in which two winding spindles 2 and 3 are mounted for rotation. At their lower ends the winding spindles 2 and 3 are each connected coaxially to a turntable 4 and 5 respectively, provided with circumferential teeth. A head-mounting plate 6 is guided on the deck plate 1 for rectlinear movement in directions indicated by the double arrow 7. In a manner to be described hereinafter, the head-mounting plate 6 can occupy a retracted first position relative to the winding spindles and a magnetic-tape cassette, now shown, mounted on said spindles, and from this position the head-mounting plate can be moved to a second or a third (advanced) position, the distance of the head-mounting plate from the winding spindles 2 and 3 being smaller in the second (advanced) position than in the third (advanced) position. The head-mounting plate 6 carries two magnetic heads 8 and 9, of which the magnetic head 8 is a combined recording/playback head and the magnetic head 9 is an erase head in the present embodiment. Further, a pressure-roller lever 10 is mounted on the head-mounting plate 6 so as to be pivotable about a spindle 11 which is secured to the upper side of the deck plate 1. At the end portion which is remote from the spindle 11 the pressure-roller lever 10 carries a pressure roller 12 which in the position as shown in FIG. 6 is urged against a capstan 13. This is in the second position, being the operation position, of the head-mounting plate 6. In the third (less advanced) position of this plate the pressure roller 12 is clear of the capstan 13. The capstan 13 is supported in the deck plate 1 and beneath this plate it is connected to a flywheel 14 which is driven by a first motor 16 via a belt 15.

Figure 2:
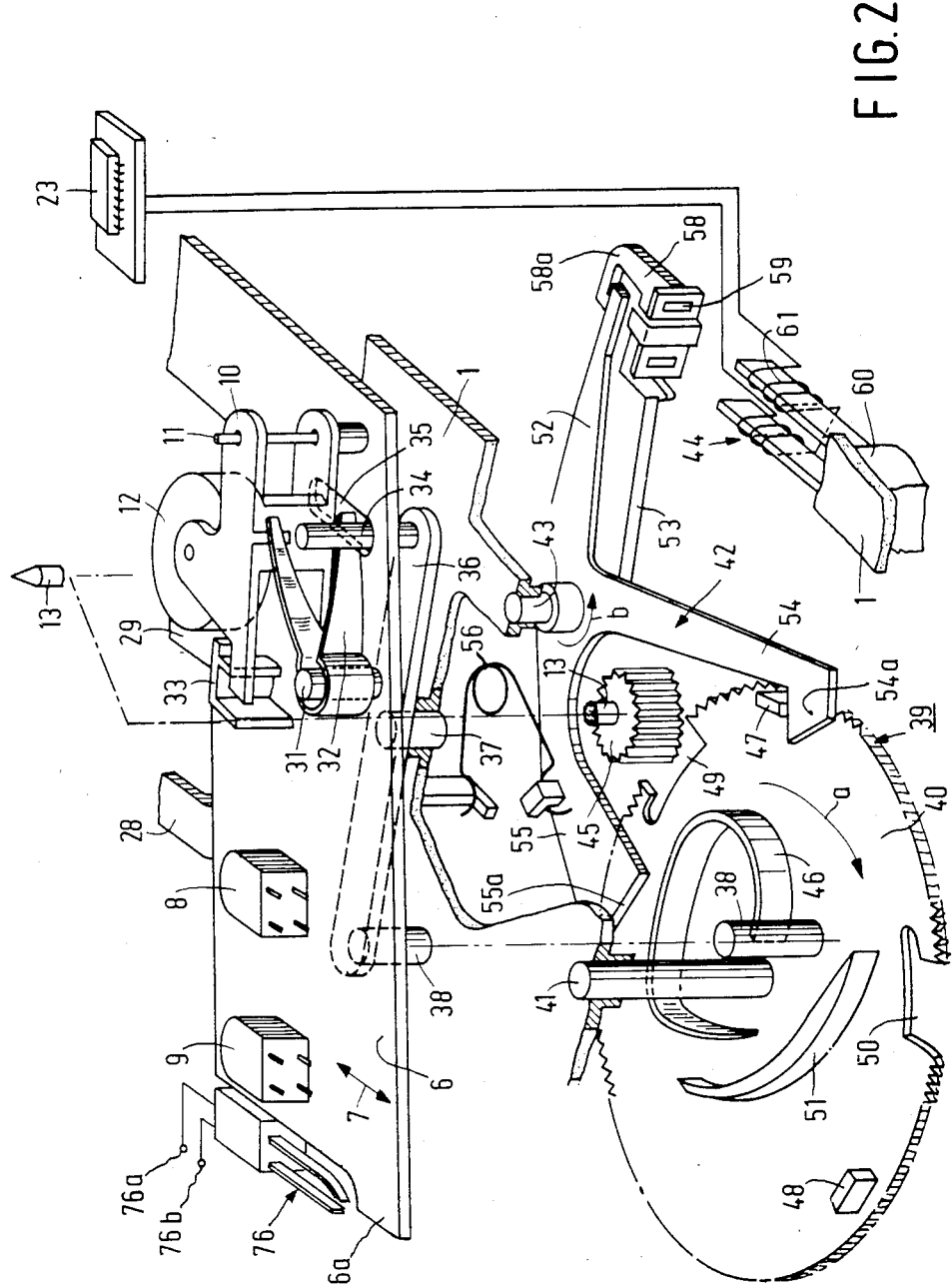
FIG. 2 is an enlarged-scale exploded view of the head-mounting plate and the associated servo device of the magnetic-tape-cassette apparatus shown in FIG. 1.

A drive wheel 17 is arranged mounted on the deck plate 1 in the space between the turntables 4 and 5 and is fixed on a spindle 18. Underneath the deck plate 1 the spindle 18 carries a worm wheel 19 which meshes with a worm 21 which is driven by a second motor 22. The motors 16 and 22 are electrically connected to a microprocessor circuit 23, by means of which circuit the two motors can be switched on and off and the direction of rotation of the motor 22 can be reversed. Further, the microprocessor circuit 23 is electrically connected to an impulse relay 44, to be described in more detail hereinafter (see inter alia FIGS. 2, 7 and 8).

Above the drive wheel 17 the spindle 18 further carries a pivotal arm 25, whose end portion which is remote from the spindle carries a stop projection in the form of a pin 26, on whose lower end portion a toothed idler wheel 27 is journalled, the wheel 27 being located in the space between the turntables 4 and 5. In a manner not shown, the pivotal arm 25 is connected to a friction spring (not shown) having a whose free end which presses in a radial direction against a portion of the idler wheel 27 which concentrically surrounds the lower end portion of the pin 26. The spring controls the pivotal movement of the arm 25 about the spindle 18 as a result of the friction torque exerted on the idler wheel 27 at the instant at which the direction of rotation of the motor 22 is reversed. Thus, by pivoting the pivotal arm 25 the idler wheel 27 can be coupled to the turntable 4 or the turntable 5, in order to drive the relevant turntable. In the manner described in the foregoing the direction of the pivotal movement depends on the direction of rotation of the second motor 22. Thus, where there is a magnetic-tape cassette is present on the magnetic-tape-cassette apparatus, the magnetic tape in the cassette can be wound by the motor 22 via the winding spindle 2 or 3. The motor 22 is constructed in such a way that, during recording and playback, winding is effected at a comparatively low speed and during fast winding at a comparatively high speed.

Projection from the head-mounting plate 6 on opposite sides of the stop pin 26 are two mutually parallel limbs 28 and 29 which are constructed and arranged mirror-symmetrically relative to a plane perpendicular to the deck plate 1 and parallel to the arrow 7. Therefore, only the left-hand limb will be described. The limb extends from the head-mounting plate 1 in the direction of movement of the plate towards its advanced positions. Adjacent its free end the limb has a recess 30 with a wall 30a which is inclined relative to the direction of movement of the plate and a stop wall 30b. When the second motor 22 is started prior to a movement of the head-mounting plate 6 towards the winding spindles 2 and 3, the stop projection 26 will enter the recess 30 the limb 28 or 29 (depending on the direction of rotation of the motor 22), so that when the head-mounting plate 6 moves towards the winding spindles 2 and 3 the stop wall 30b will abut against the stop projection 26. Thus, by first starting the second motor 22 and subsequently shifting the head-mounting plate 6 via the microprocessor circuit 23, the head-mounting plate 6 can assume the third (advanced) position described in the foregoing. In this position the idler wheel 27 is in engagement with the turntable 4 or 5 and fast-winding of the magnetic tape onto the winding spindle 2 or 3 is possible, depending on the direction of rotation of the motor 22. For a more detailed description of the operation of the drive mechanism of these turntables and the manner in which the pivotal arm 25 is povited to cooperate with the limbs 28 and 29, reference is made to the Netherlands Patent Application No. 8304313 filed on 15.12.83, to which co-pending U.S. patent application Ser. No. 679,189 corresponds.

A substantially U- or V-shaped blade spring 32 which is mounted on a pin 31 exerts pressure on the pressure-roller lever 10, an abutment 33 being arranged on the head-mounting plate 6 to limit the pivotal movement of the pressure-roller lever about the spindle 11 in a clockwise direction under the influence of the spring 32. One limb of the spring 32 bears against the pressure-roller lever 10 and the other limb bears against a pin 34 which is guided in a slot 35 in the head-mounting plate 6. The pin 34 is mounted at the free end of one arm of a two-armed actuating lever 36 which is pivotable about a pivot 37 connected to the deck plate 1. At the free end of the other arm the actuating lever 36 carries a pin 38, which extends through the deck plate to a servo device 39 which is situated underneath the deck plate—and which will be described in more detail hereinafter.

Figure 3:
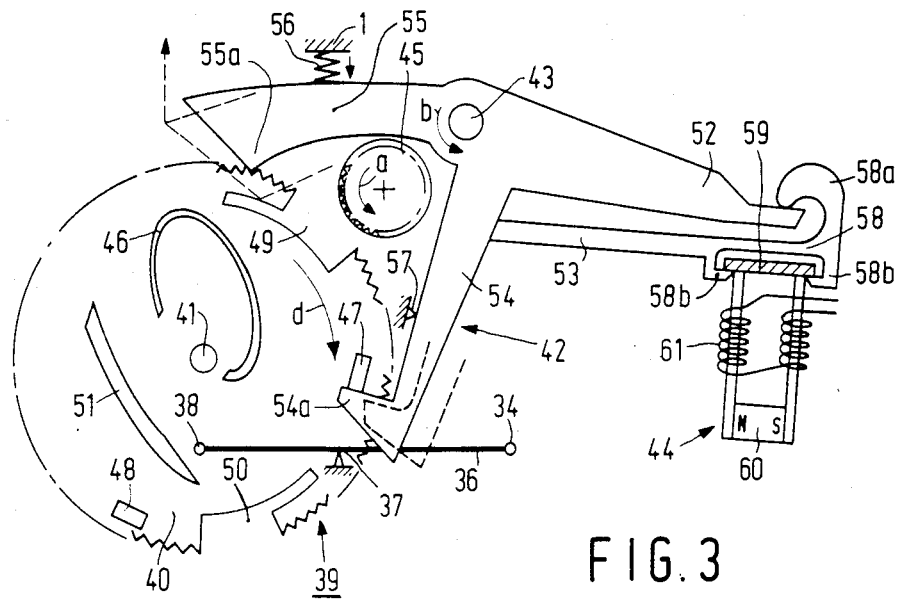
FIG. 3 is a schematic plan view showing the servo device in a first rest position.

The servo device 39 comprises a servo wheel 40 which is rotatably journalled in the deck plate 1 by means of a spindle 41. Further, the servo device 39 comprises a relay-armature member 42, which is pivotable about a spindle 43 mounted on the underside of the deck plate 1. The relay-armature member 42 is adapted to cooperate with an impulse relay 44, which is also secured to the underside of the deck plate 1. The servo wheel can be driven by a gear wheel 45, which is rigidly mounted on the spindle of the flywheel 14 and which can thus be driven by the first motor 16 which causes the gear wheel 45 to rotate in the direction indicated by the arrow a in FIG. 3. As shown in FIG. 3 the servo wheel 40 carries cam 46 which is disposed eccentrically around the spindle 41, and two latching projections 47 and 48 which are spaced from each other at angles of approximately 140° about the spindle 41. The servo wheel 40 is provided with circumferential teeth and has two recesses 49 and 50 in its periphery where the wheel is not toothed, which recesses are also spaced at an angle of 140° from each other. Due to the presence of the two latching projections 47 and 48 the servo wheel 40 can occupy a first rest position (see FIG. 3) or a second rest positoin (see FIG. 5), in which the respective recess 49 or 50 respectively is situated opposite the gear wheel 45 with the result that the gear wheel cannot drive the servo wheel. The servo wheel 40 further carries a ridge 51 which is also disposed eccentrically relative to the spindle 41.

Figure 5:
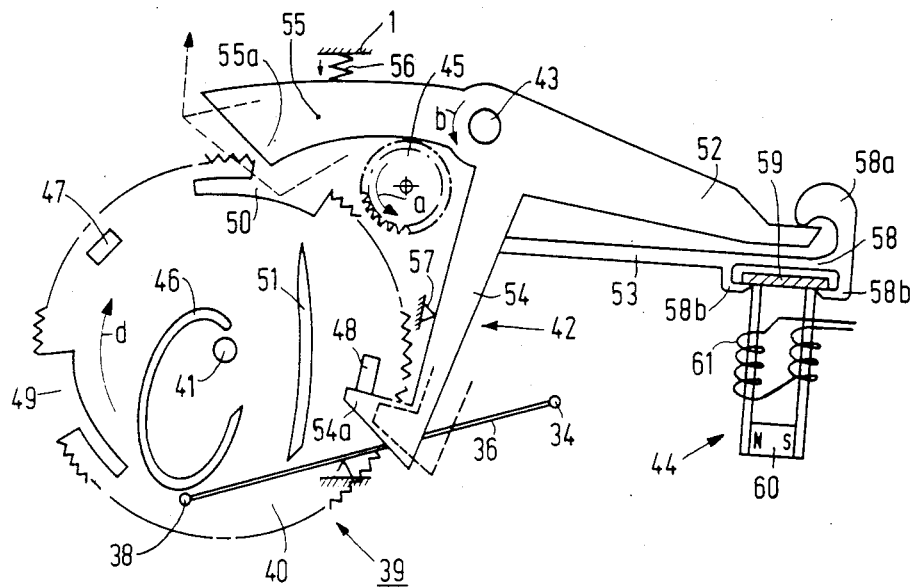
FIG. 5 is a schematic plan view showing the servo device in a second rest position.

The relay-armature member 42 comprises four arms, namely a rigid arm 52, an elastically deflectable arm 53, a stop arm 54 and a reset arm 55. The reset arm 55 is loaded by a spring 56 which is connected to the deck plate 1 and which constantly tends to pivot the relay-armature member 42 about the spindle 43 in the direction indicated by the arrow b. The reset arm 55 comprises a reset projection 55a, which is situated at the free end of the arm 55 near the circumference of the servo wheel 40 and which comprises two convergent walls forming an angle with each other. At its free end the stop arm 54 carries a stop projection 54a which is constructed as a hook and which comprises a stop wall which is disposed substantially tangentially relative to an imaginary circle concentric with the spindle 43 for abutment with the latching projection 47 or 48. In the rest positions shown in FIGS. 3 and 5 the latching projection 47 and 48 respectively abut against the stop projection 54a so that the servo wheel 40 is latched in the respective rest position. In this position the stop arm 54 is positioned against a stop 57 on the deck plate 1, which stop defines the position of the relay-armature 42 in the latching position. At its free end the deflectable arm 53 comprises a rigid support 58 which comprises a coupling element 58a which is hook-shaped and, viewed in a direction parallel to the spindle 43, extends from the support 58 around the free end of the rigid arm 52 and in the coupled position shown in FIG. 3 engages that side of the rigid arm 52 which is remote from the support 58. Further, the support 58 comprises retaining portions 58b which serve to retain a plate-shaped soft-iron element 59. The latching position of the relay-armature member, as shown in FIGS. 3 and 5, the soft-iron element is drawn against the impulse relay 44.

The impulse relay 44 comprises a permanent magnet 60 comprising two limbs around which two coils 61 are wound. Consequently, the relay 44 comprises both a permanent magnet and an electromagnet whose coils are connected to a current source, not shown, under control of the microprocessor circuit 23. The operation of the impuls relay 44 is arranged so that when the coils 61 are not connected to the current source the magnet 60 constantly attracts the soft-iron element 59 as a result of its permanent magnetism. In the latching position the relay-armature member 42 is therefore kept firmly in position by means of the stop 57 and the impulse relay 44. A brief energization of the coils 61, which can be achieved by means of an electrical pulse, causes the permanent magnetism of the magnet 60 to be neutralized by the electromagnet, so that the soft-iron element 59 is no longer attracted. The spring 56 then causes the relay armature member 42 to pivot about the spindle 43 in the direction indicated by the arrow b. It is to be noted that the relay-armature member comprising the four arms 52 to 55 may be made in one piece from a plastics material, so that for assembly only the soft-iron element 59 has to be fitted into the support 58. By means of the support 58 the soft-iron element 59, which is coupled to the arm 55 via the hook 58a, can be pivoted with the relay-armature when this member pivots in the direction indicated by the arrow b, and when the relay-armature member 42 is pivoted in the direction opposite to that indicated by the arrow b, due to the rigid arm 52 can be pivoted slightly further after the soft-iron element 59 has been attracted by the magnet 60. This will be described in more detail hereinafter.

Figure 4:
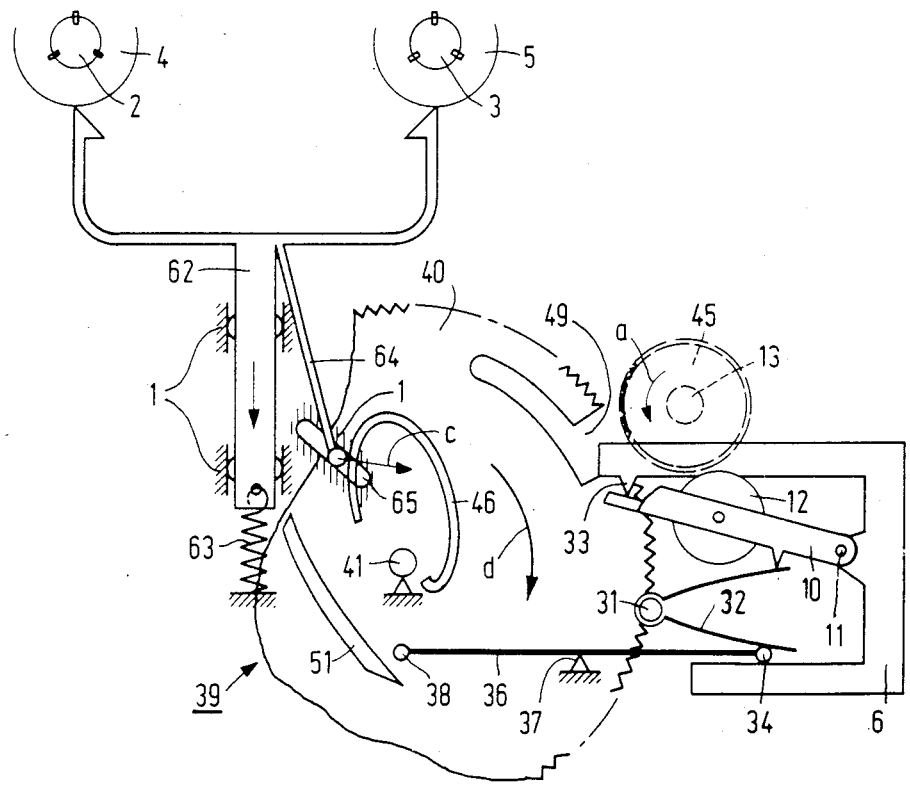
FIG. 4 is a schematic plan view showing the servo device in the first rest position of FIG. 3 and a part of the head-mounting plate and a brake member.

As is shown in FIG. 4, a brake member 62 is guided in the deck plate 1 so as to be slidable towards and away from the turntables 4 and 5, a spring 63 constantly urging the brake member 62 away from the turntables 4 and 5. The brake member 62 carries a projecting element 64 which is guided in a slot 65 in the deck plate 1. In the first rest position of the servo wheel 40 the free end of the element 64 presses against the eccentric cam 46 under the influence of the spring 63 and exerts a starting torque (arrow c) which tends to rotate the wheel 40 about the spindle 41 in the direction indicated by the arrow d. As long as the stop projection 54a on the relay-armature member 42 is in engagement with the latching projection 47, this starting torque c can have no effect. However, if as a result of the pulse-wise energization of the impulse relay 44 the soft-iron element 59 is no longer attracted, the relay-armature member 42 can pivot about the spindle 43 in the direction indicated by the arrow b. In this respect it is advantageous that the relay-armature member 42 is rigid except for the deflectable arm 53, so that the friction between the stop projection 54a nad the latching projection 47 can be compensated for effectively. After the release of the servo wheel 40 the starting torque (arrow c) can rotated the servo wheel to bring the circumferential teeth of the servo wheel into mesh with the gear wheel 45, which is driven by the motor 16, so that the servo wheel is rotated further in the direction indicated by the arrow d as a result of the rotation of the gear wheel 45 in the direction indicated by the arrow a. Depending on the distance through which the head-mounting plate 6 is to be moved, the second motor 22 has not yet been started at the instant at which the impulse relay 44 is energized if the plate is to be moved to the farthest advanced position, and if the plate is to be moved to third less advanced position the second motor 22 should be started before the impulse relay is electrically energized. During rotation of the servo wheel 40 the actuating lever 36 is moved into the position shown in FIGS. 5 and 6 by means of the eccentric cam 46. The lever can assume this position because the latching projection 48, as is also shown in FIG. 5, has first engaged the reset projection 55a on the relay-armature member 42 and thereby pivotally reset this member from the inoperative position (shown in broken lines) to the latching position. Subsequently, after the final part of the rotation of the latching projection 48, this projection abuts against the stop projection 54a on the relay-armature member 42, so that the servo wheel 40 is now latched again. In this position the recess 50 in the servo wheel 40 is disposed opposite the gear wheel 45, so that a further rotation of the gear wheel 45 has no effect on the servo wheel 40. During the pivotal movement of the actuating lever 36 by the cam 46, pressure is exerted on the spring 32 via the pin 34, so that this spring presses against the pressure-roller lever 10. As a result of this force, since the pressure-roller lever 10 abuts the abutments 33, the head-mounting plate 6 is advanced to the second or the third advanced position (which has already stated depends on whether the second motor 22 has or has not been switched on before the impulse-relay is energized). In the second (advanced) position the pressure roller 12 now presses against the capstan 13, with the result that the pin 34 moves slightly further than the head-mounting plate 6, so that there is sufficient pressure on the pressure roller 12. This has the advantage of compensating effectively for possible tolerances in the transmission between the cam 46 and the head-mounting plate 6. From the instant at which the pressure roller 12 presses against the capstan 13 recording or playback may commence and the tape may be wound towards the winding spindle 3.

When the end of the tape is reached or if a stop button, not shown, is actuated, the impulse relay 44 is re-energized. As a result of this, the relay-armature member is again moved from the latching position to the inoperative position, whilst in addition the latching projection 48 is disengaged from the stop projection 54a. In this situation the actuating lever 36 presses against the eccentric cam 46 in such a way that the pressure exerted on the actuating lever 36 by the spring 32 produces a starting torque on the cam, so that after release of the relay-armature member 42 the servo wheel 40 can rotate further in the direction indicated by the arrow d, so that the circumferential teeth on the servo wheel can again mesh with the gear wheel 45. As a result of this, the servo wheel is again driven, the pin 38 being guided between the cam 46 and the ridge 41 so that the actuating lever 36 is pivoted back in a clockwise direction about the spindle 37. This results in the pin 34 pressing directly against the end wall of the slot 35 in the head-mounting plate 6, so that this plate is moved towards the retracted (or first) position in the direction indicated by the arrow 7. When the servo wheel 40 begins to rotate, the cam 46 has exerts a force on the projecting element 64 of the brake member 62 such that the brake member is briefly moved towards the turntables 4 and 5. Consequently, during the rotation of the servo wheel 40 the braking member is actuated and the turntables 4 and 5 are braked. During the rotation in the direction indicated by the arrow d, the latching projection 47 cooperates with the reset projection 55a on the relay-armature member 42 to return this member from the inoperative position to the latching position (see FIG. 3). Subsequently, the latching projection 47 again abuts the stop projection 54a so that the servo again occupies the first rest position shown in FIG. 3. In this way the servo wheel can be moved from a first rest position (FIG. 3) to a second rest position (FIG. 5) and back again to the first rest position (FIG. 3). The head-mounting plate 6 is then moved from the retracted (first) position to one of the advanced positions (the second or third position) and back to the retracted position, whilst during the return movement of the head-mounting plate the brake member 62 is actuated to brake the turntables. The construction described above has the advantage that the relay-armature member, which cooperates with the impulse relay, needs to be energized only briefly in order to enable the servo wheel to be released. As a result of this pulse-wise energization only a small current will flow in the coil 61, and the heat dissipation is minimal. This is of particular advantage in compact battery-powered equipment or equipment controlled by microprocessor circuits. The construction of the relay-armature member 42 enables tolerances in the servo device to be compensated for effectively. Resetting of the relay-armature member 42 from the inoperative position to the latching position is always effected over a distance which is slightly larger than strictly necessary, the excess pivotal movement of the rigid arm 52 of the member 42 ensures that the soft-iron element 59 is correctly positioned against the magnet 60. Further it is thus possible to bridge a comparatively large distance between the soft-iron element 39 and the impulse relay.

The head-mounting plate 6 also comprises a projection 6a which cooperates with a switch 76 (see FIG. 2) mounted on the deck plate 1. If the head-mounting plate 6 is in the first (or withdrawn) position, the switch 76 is open. If the head-mounting plate 6 is in the most advanced (second) position (which is the case during "playback" or "record"; the pressure roller 12 then presses against the capstan 13), the projection 6a is pressed against one limb of the switch 76, so that the switch is closed. The switch is also closed in the intermediate (third) position of the head-mounting plate (during "fast winding"; the pressure roller 12 is then clear of the capstan 13). This switch is necessary, inter alia in the case of a power-supply failure, to detect the position of the head-mounting plate 6 and hence of the pressure roller 13, as will be apparent from the following description of the first and the second means with reference to FIGS. 7, 8 and 9.

Figure 7:
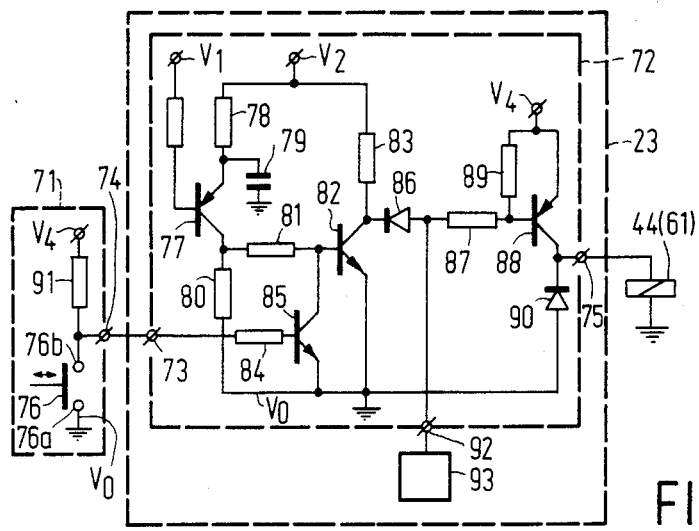
FIG. 7 shows a first example.

FIG. 7 shows a first example of the first and the second means in accordance with the invention.

FIG. 7 shows the first means 71, which form part of the servo device, for determining whether the apparatus part, namely the head-mounting plate 6, is in the second position. This means that it serves for detecting whether the pressure roller 12 and the capstan 13 are pressed against one another. FIG. 7 further shows the second means 72, which also form part of the servo device. The second means 72 have an input 73 coupled to an output 74 of the first means 71 and an output 75 coupled to the impulse relay 44 (in particular, the coils 61 of this relay) and serve for supplying a pulse-shaped energizing signal to the impulse relay 44 at the instant at which the power supply to the servo device is cut off if the apparatus part is in the second position.

The first means 71 comprise the switch 76, whose position is related to the position of the apparatus part. The second means 72 comprise a PNP transistor 77, whose base is coupled to a first point at a first potential $V_1$, whose emitter is coupled to a second point at a second potential $V_2$ via a delay means constituted by a resistor 78 and a capacitor 79, and whose collector is coupled to a third point at a potential $V_0$ (earth) via an impedance constituted by a resistor 80. The collector of the transistor 77 is coupled to the base of an NPN transistor 82 via an impedance in the form of a resistor 81, which transistor 82 has its emitter coupled to $V_0$ (earth) and has its collector coupled to the second point via a resistor 83.

The input 73 of the second means 72 is coupled to the base of an NPN transistor 85 via a resistor 84, which transistor has its emitter coupled to $v_0$ (earth) and its collector coupled to the base of the transistor 82. The collector of the transistor 82 is coupled to the base of a PNP transistor 88 via a diode 86 and an impedance in the form of a resistor 87. The base of the transistor 88 is connected to a fourth point at a potential $V_4$ via a resistor 89. The emitter of the transistor 88 is connected directly to $V_4$. The collector of the transistor 88 constitutes the output 75 of the second means 72 and via a diode 90 it is also coupled to $V_0$ (earth).

One terminal 76a, of the switch 76 of the means 71 is coupled to $V_0$ (earth) and the other terminal 76b is coupled to the output 74 and, via an impedance 91 in the form of a resistor, to $V_4$.

$V_1$ is for example 12 V, $V_2$ is 8 V and $V_4$ is 5 V. If the magnetic-tape-cassette apparatus is in the "playback", "recording", or "fast-wind" mode, the switch 76 is closed and said voltages appear on points $V_1$, $V_2$ and $V_4$. Since the switch 76 is closed, the transistor 85 is cut off and the base voltage of the transistor 82 is determined by the setting of transistor 77. Since the base voltage of the transistor 77 is higher than the emitter voltage of this transistor, this transistor is cut off. The collector voltage of the transistor 77, and hence the base voltage of the transistor 82, is low (0 V), so that the transistor 82 is also turned off.

At the instant it is assumed that a "high" signal appears on a second input 92 of the second means 72, so that consequently the voltage on the base of the transistor 88 is higher than that on its emitter. The transistor 88 is cut off, so that no energizing signal is applied to the relay 44 via the output 75.

If the power supply is now switched off, the voltage $V_1$ decreases from the value $V_1$ (=12 V) to 0. In the time that $V_1$ decreases from $V_1$ to $V_4$ (=5 V), the voltage on the base of the transistor 77 will briefly be lower than the voltage on the emitter of the transistor 77. This is achieved in that the resistor 78 and the capacitor 79 provide a delay, as a result of which the voltage on the emitter of the transistor 77 is maintained at $V_2$ for a specific time. As the transistor 77 is briefly turned on, the collector voltage of the transistor 77 and hence the base voltage of the transistor 82 increase, so that the transistor 82 is also briefly turned on. Consequently, the base voltage of the transistor 88 is pulled towards earth potential, so that the transistor 88 conducts briefly and the impulse relay 44 briefly receives an electric energizing signal. Thus, the servo device can move the head-mounting plate to its withdrawn (first) position, e.g. because of the fact that the flywheel 14 has sufficient kinetic energy to rotate the servo wheel 40 over the relevant angle.

If the head-mounting plate is already in this first position, the switch 76 is open. The base voltage of the transistor 85 is then "high", so that this transistor conducts. The base voltage of the transistor 82 is now low (0 V), so that this transistor is always cut off. The second means 72 now cannot generate an energizing signal if the power supply fails.

The second input 92 is intended for controlling the magnetic-tape-cassette apparatus in the customary manner when the power supply is switched on, by means of a control unit 93 which forms part of the microprocessor 23. If the apparatus should be set to "playback", the control unit 93 produces a signal which is briefly "low" (0 V) on the input 92. In this case the transistor 88 is also briefly turned on, so that the coils 61 of the impulse relay 44 are briefly energized. If the apparatus should be switched off, the control unit 93 again produces a signal which is briefly "low" (0 V) on the input 92, so that the impulse relay is re-energized and the head-mounting plate assumes its first withdrawn position. Thus, in the case of a cut-off power supply the energizing signal is not only supplied if the apparatus is set to the "playback" mode but also if the apparatus is set to the "fast wind" or "recording" mode.

It is to be noted that the voltages $V_1$ and $V_2$ may be equal. Alternatively, $V_1$ may be higher than $V_2$. In the second case the time between the instant at which the power supply drops and the instant at which this is detected is longer. $V_4$ may also be equal to $V_2$. However, in that case the operating voltage of the relay 44 should be lower than $V_2$ for a correct operation of this relay. Alternatively, $V_4$ may be lower than $V_2$.

Figure 8:
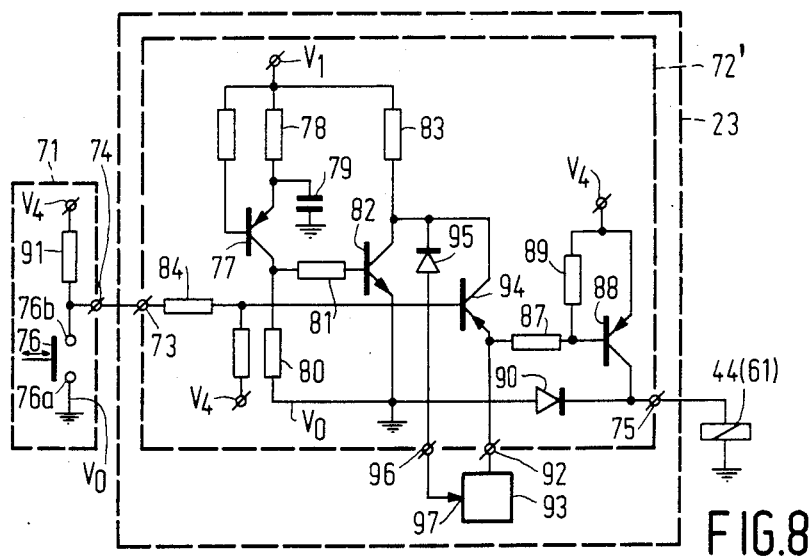
FIG. 8 shows a second example of the first means and the second means for generating a brief electrical energizing signal for the impulse relay.

FIG. 8 shows a second example. Here the voltage $V_2$ is equal to $V_1$. This means that the base and the emitter of the transistor 77 are now connected to the same voltage via an associated impedance. However, after the collector of the NPN transistor 82 the circuit is slightly different. The collector of the transistor 82 is now coupled to the collector of a PNP transistor 94. The emitter of the transistor 94 is coupled to the base of the transistor 88 via an impedance 87 and is coupled directly to the second input 92. Further, the input 73 is now coupled to the base of the transistor 94 via an impedance 84. Moreover, the base of the transistor 94 is coupled to $V_4$ via an impedance.

The circuit operates as follows. If the magnetic-tape-cassette apparatus is set to for example "playback", the switch 76 is closed. The base of the transistor 94 is therefore relatively low, which means that the transistor 94 is "on". Thus, the collector voltage of the transistor 94 determines whether a current will flow in the transistor 94. As already stated in the description with reference to FIG. 7, the transistor 82 will conduct briefly when the power supply is cut off. The collector voltage of the transistor 82 and hence that of the transistor 94 therefore become briefly low, so that a current will flow in the transistor 94. Consequently, the base of the transistor 88 becomes "low", so that the transistor 88 conducts briefly and the relay 44 is energized.

The servo device returns the head-mounting plate 6 to the first position. If the head-mounting plate is already in the first position, the switch 76 is open. The base voltage of the transistor 94 is now "high", which means that the transistor 94 is cut off. The base of the transistor 88 is therefore "high", so that the transistor 88 is turned off. The effect of detection of a voltage drop by the transistor 77 is therefore inhibited by the transistor 94 and in this case such detection does not result in an energizing signal being supplied to the relay 44.

Normal control of the tape deck by means of the control unit 93 proceeds via the input 92. Depending on whether the magnetic-tape-cassette apparatus is set to the "playback" mode or the "fast wind" mode or should be switched off from the "playback" mode or the "fast wind" mode, the control unit 93 supplies a signal which is briefly "low" to the input 92. The transistor 88 now conducts briefly, so that the impulse relay 44 briefly receives an energizing signal.

The collector of the transistor 82 is also coupled to a second output 96 of the second means via a diode 95. The output 96 is coupled to a reset input 97 of the control unit 93. This connection serves the following purpose.

As a result of voltage variations in the electric power mains it may happen that the voltage $V_1$ (for example 12 or 8 V) decreases briefly and is subsequently restored to its previous value, so that the transistor 77 has detected a voltage decreases, whilst the voltage $V_4$, which is generally lower (for example 5 V) and which also serves for powering the control unit 93, has remained constant during this time interval.

If the magnetic-tape-cassette apparatus was in the "playback" mode prior to said brief voltage decrease, the impulse relay 44 will receive a brief energizing signal as a result of the detection of this voltage decrease, so that the head-mounting plate 6 is moved to the first position. Since the power supply for the control unit 93 has remained at the normal level, the internal status of the control unit 93 will not have changed. This is an undesirable situation because the internal status of the control unit 93 still the "playback" status, although the head-mounting plate 6 is already in the first position.

The connection from the collector of the transistor 82 to the reset input 97 of the control unit 93 via the diode 95 serves to supply a reset pulse to the control unit 93 in the aforementioned case, so that the control unit 93 can be reset to a specific initial status.

Figure 9:
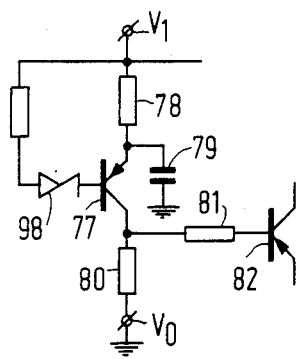
FIG. 9 shows a part of a slightly different version of the second means of FIG. 8.

FIG. 9 shows a further extension of the circuit of FIG. 8.

FIG. 9 shows only the relevant part of the circuit of FIG. 8. A zener diode 98 is arranged in the connection from the base of the transistor 77 to point $V_1$. This step serves two purposes. Firstly, it is now possible to use a power-supply with a less effective smoothing (cheaper) for the voltage $V_1$. The smoothing action of the capacitor 79 results in a far more constant voltage on the emitter of the transistor 77. In the case of a large ripple on the voltage $V_1$ and hence on the base voltage of the transistor 77, the transistor would be turned on briefly with the same frequency as the ripple in the absence of the zener diode 98, which is of course undesirable. This is precluded by means of the zener diode 98 provided that it has a suitable breakdown voltage.

Moreover, it is possible to determine the time interval between the instant at which the power-supply voltage drops and the instant of detection by the transistor 77, which time interval depends on the value of the breakdown voltage of the zener diode 98. By increasing or reducing the breakdown voltage the time interval is also increased or reduced.

As is shown in FIGS. 7 and 8, the secomd means 72 and 72' may be integrated in the microprocessor 23. Alternatively, the second means may be integrated in a separate IC.

It is to be noted that although the step in accordance with the invention, i.e. the use of the first means and the second means, is described for a magnetic-tape-cassette apparatus as shown in FIGS. 1 to 6, which apparatus forms the subject of the Netherlands Patent Application No. 8402145, filed on July 6, 1984, to which co-pending U.S. patent application Ser. No. 751,354 corresponds, the step may also be applied to other servo controlled magnetic-tape-cassette apparatuses, for example those as described in the said documentation from KISHO-Electronics Co., Ltd. (Japan).

Further, it is to be noted that in general various modifications of the embodiments described herein are possible without departing from the scope of the invention as defined in the claims.

For example, the servo device shown need not be used only for actuating a head-mounting plate carrying a pressure roller. It is obvious that the servo device may also be employed for actuating other apparatus parts, such as for shifting gear wheels, for starting the rotation of a head (e.g. in an auto-reverse tape deck), and for inserting or ejecting a magnetic-tape cassette.

What is claimed is:

1. A magnetic-tape-cassette apparatus, comprising a servo device for positioning at least one apparatus part, which servo device comprises a servo wheel having at least one recessed portion, which faces a motor-driven wheel in a rest position of the servo wheel, which servo wheel further carries an eccentric cam and at least one latching projection, which eccentric cam is subjected to a starting torque produced by spring force in the rest position of the servo wheel, which servo device further comprises a relay-armature member which is pivotable between a latching position and an inoperative position and which carries a soft-iron element which in the rest position of the servo wheel is attracted by an impulse relay and thereby maintains the relay-armature member in the latching position, in which position a stop projection on the relay-armature member cooperates with the latching projection on the servo wheel, so that the stop projection keeps the servo wheel latched in the rest position, whilst after a brief electrical energization of the impulse relay the relay-armature member is pivoted under spring force from the latching position to the inoperative position, in which inoperative position the stop projection is clear of the latching projection and, under the influence of the starting torque exerted on the eccentric cam, the servo wheel is rotated, the circumference of the servo wheel engages the motor-driven wheel, and the servo wheel is driven by the motor to position the apparatus part, after which the latching projection cooperates with a reset projection on the relay-armature member, so that the relay-armature member is returned against spring force from the inoperative position to the latching position, subsequently the latching projection again abuts against the stop projection, and the stop projection again latches the servo wheel in the rest position, characterized in that for moving the apparatus part from a first position, corresponding to a rest position of the apparatus part, to a second position, corresponding to an operating position of the apparatus part, and back to said first position the servo device further comprises:

first means for determining which of the two positions the apparatus part occupies, and second means having an input coupled to an output of the first means and having an output coupled to the impulse relay, which second means are capable of supplying a brief electric energizing signal to the impulse relay at the instant at which the power supply is cut off if the apparatus part is in the second position, but not at said instant if the apparatus part is in the first position.

2. A magnetic-tape-cassette apparatus as claimed in claim 1, characterized in that the first means comprise a switch whose state is related to the position of the apparatus part.

3. A magnetic-tape-cassette apparatus as claimed in claim 1 or 2, characterized in that the second means comprise a transistor having its control electrode coupled to a first point at a first potential, having a first main electrode coupled to a second point at a second potential via a delay means, and having a second main electrode coupled to a third point at a third potential via an impedance and to the output of the second means.

4. A magnetic-tape-cassette apparatus as claimed in claim 3 the third point is at a lower potential than the first point and the second point, and the transistor is a PNP transistor whose emitter and collector constitute the first main electrode and the second main electrode, respectively.

5. A magnetic-tape-cassette apparatus as claimed in claim 4, characterized in that the collector of the transistor is coupled to the base of a second transistor of the NPN type via a first impedance, which transistor has its emitter coupled to the third point and has its collector coupled to the second point via a second impedance and to the base of a third transistor of the PNP type via a diode and a third impedance, the collector of said third transistor constituting the output of the second means and being coupled to the third point via a diode, which third transistor has its base coupled to a fourth point at a fourth potential via a fourth impedance and has its emitter coupled directly to said fourth point.

6. A magnetic-tape-cassette apparatus as claimed in claim 5, characterized in that the input of the second means is coupled to the base of a fourth transistor of the NPN type, whose emitter is coupled to the third point and whose collector is coupled to the base of the second transistor.

7. A magnetic-tape-cassette apparatus as claimed in claim 4, characterized in that the collector of the transistor is coupled to the base of a second transistor of the NPN type via a first impedance, which second transistor has its emitter coupled to the third point and has its collector coupled to the second point via a second impedance and to the collector of a third transistor of the PNP type, whose emitter is coupled to the base of the fourth transistor of the PNP type via a third impedance, the collector of said fourth transistor constituting the output of the second means and being coupled to the third point via a diode, which fourth transistor has its base coupled to a fourth point at a fourth potential via a fourth impedance and has its emitter coupled directly to said fourth point.

8. A magnetic-tape-cassette apparatus as claimed in claim 7, characterized in that the input of the second means is coupled to the base of the third transistor.

9. A magnetic-tape-cassette as claimed in claim 8, characterized in that a zener diode is arranged in the connection between the first point and the control electrode of the first-mentioned transistor.

10. A magnetic-tape-cassette apparatus as claimed in claim 9, characterized in that the first means comprise a switch which has one terminal coupled to the third point and its other terminal to the output of the first means, and the switch is open if the apparatus part is in the first position and closed if the apparatus part is in the second position.

11. A magnetic-tape-cassette apparatus as claimed in claim 3, characterized in that the first means comprise a switch which has one terminal coupled to the third point and its other terminal to the output of the first means, and the switch is open if the apparatus part is in the first position and closed if the apparatus part is in the second position.

12. A magnetic-tape-cassette apparatus as claimed in claim 3, characterized in that a zener diode is arranged in the connection between the first point and the control electrode of the first-mentioned transistor.

* * * * *